M. E. PETERS, G. H. FATH & A. F. MILLER.
SECOND STAGE TREATMENT FOR BOX WRAPPING MACHINES.
APPLICATION FILED SEPT. 25, 1916.
1,251,814.
Patented Jan. 1, 1918.
6 SHEETS—SHEET 1.
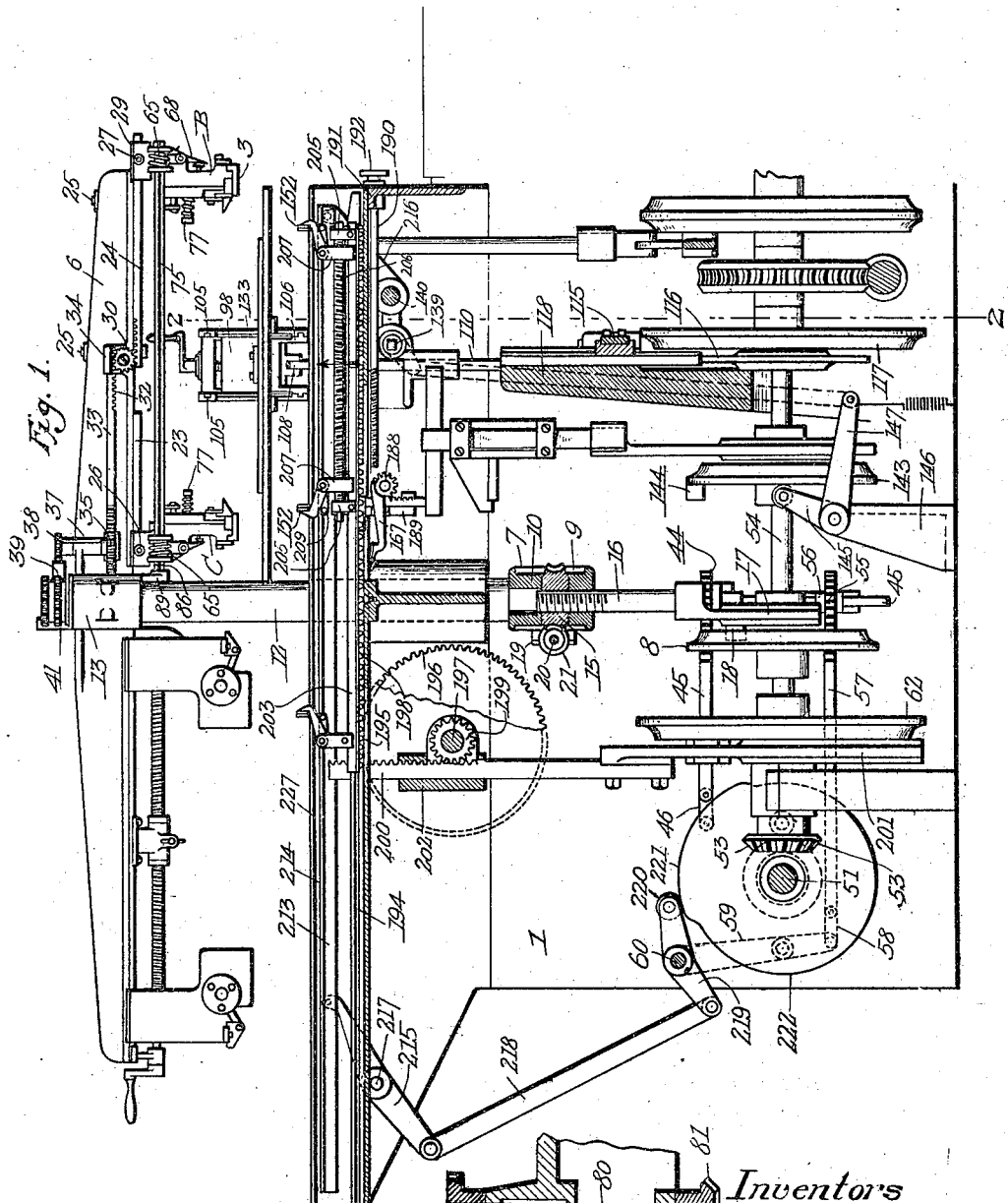
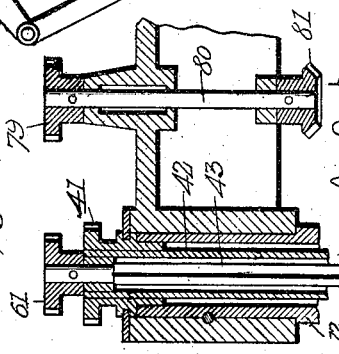
Witnesses
G. Sargent Elliott
Adella M. Fowle
Inventors
Melville E. Peters
George H. Fath
Albert F. Miller
By H. S. Bailey
Attorney

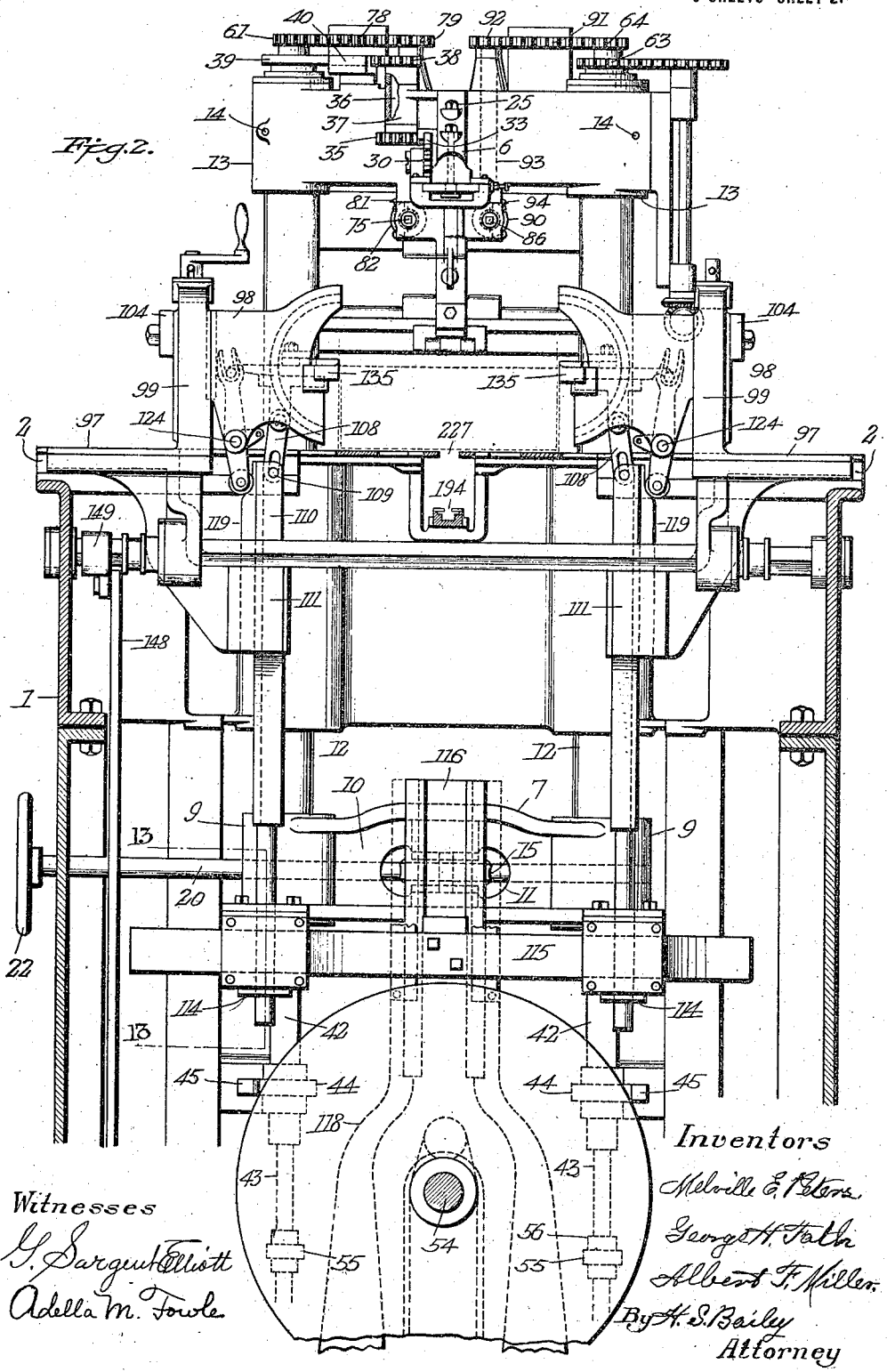

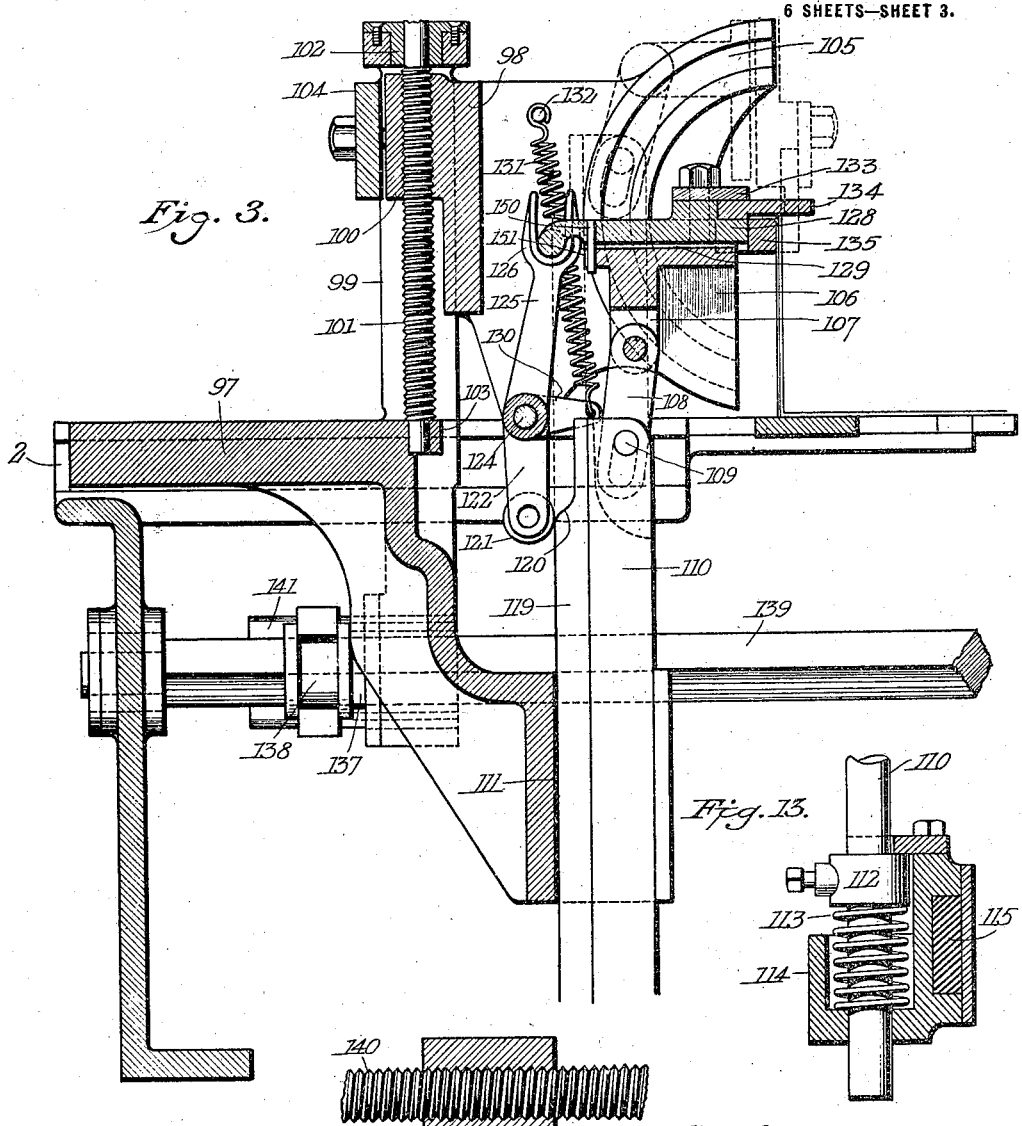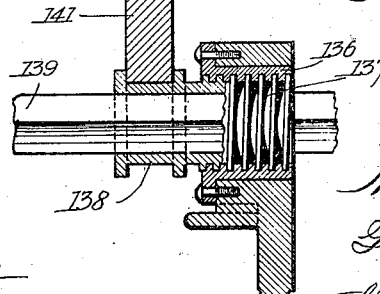

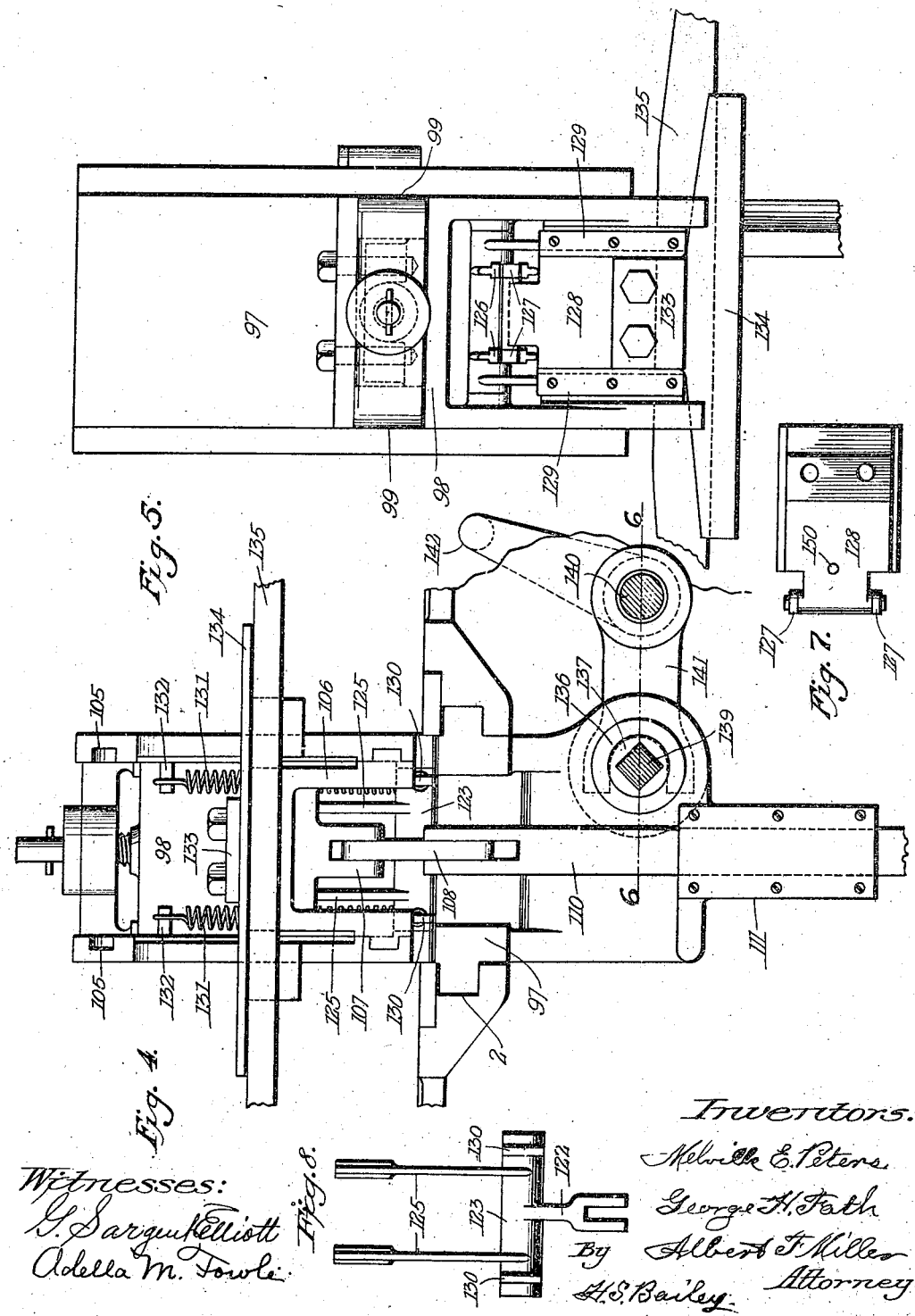

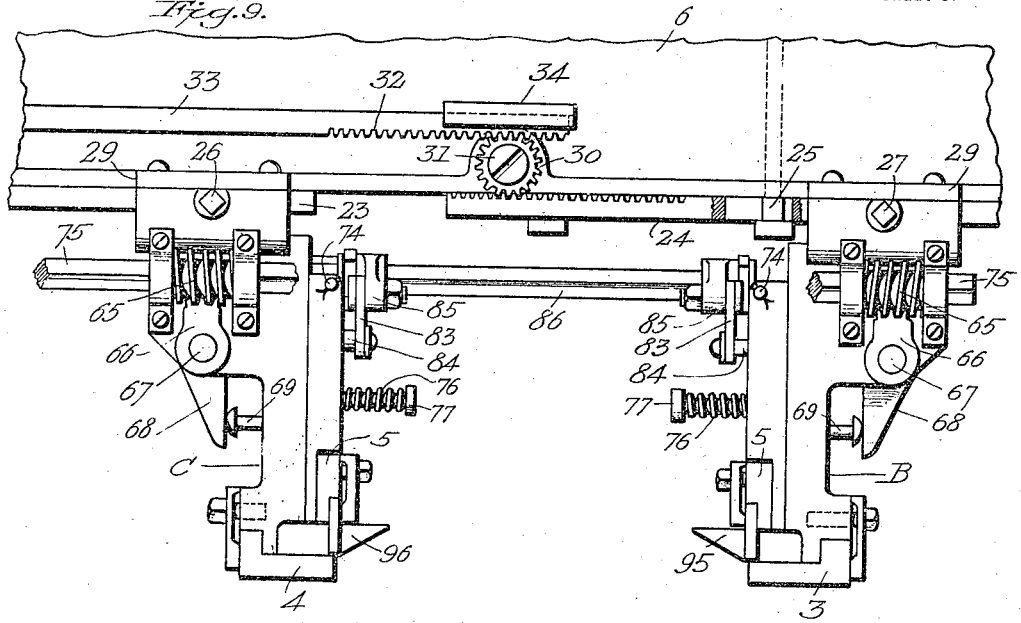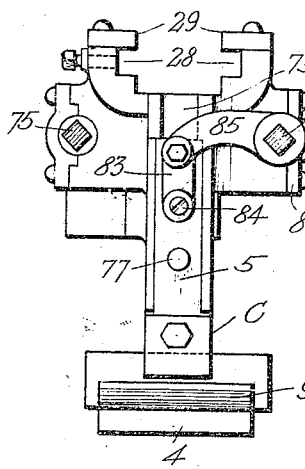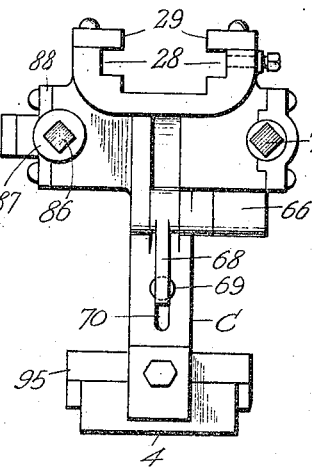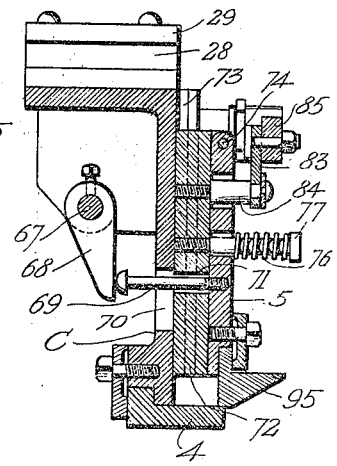

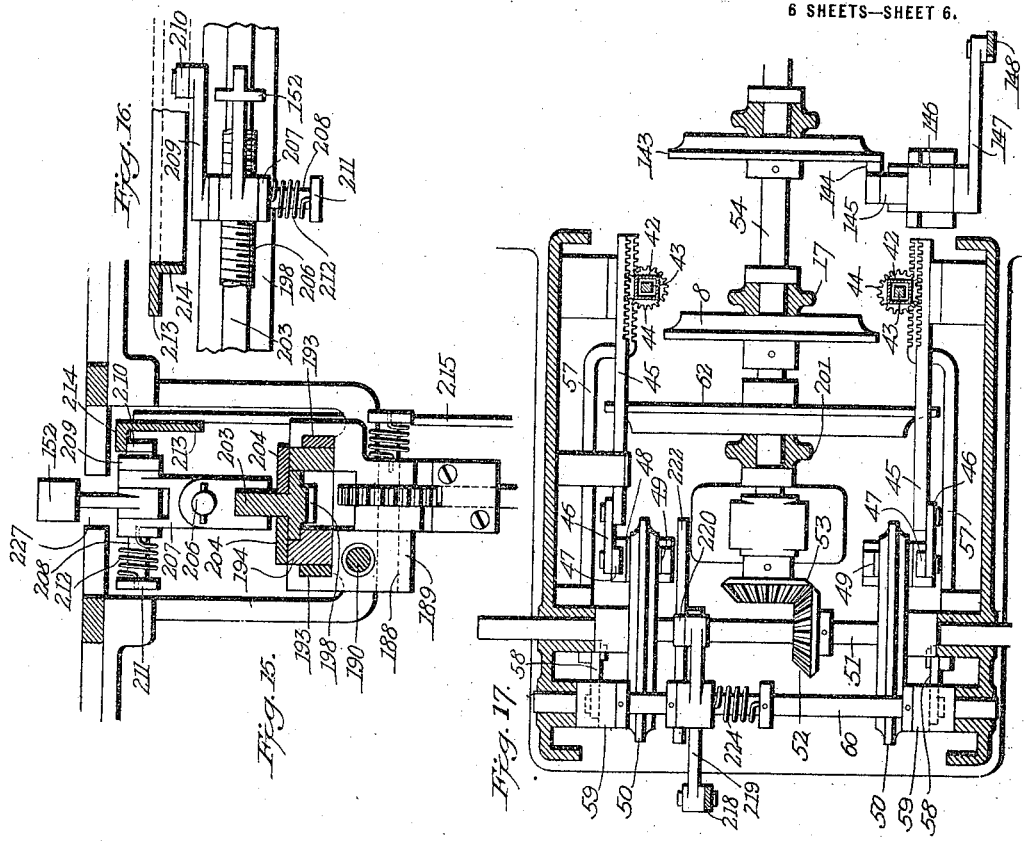

UNITED STATES PATENT OFFICE.

MELVILLE E. PETERS, GEORGE H. FATH, AND ALBERT F. MILLER, OF DENVER, COLORADO, ASSIGNORS TO THE PETERS PATENT RIGHTS COMPANY, OF DENVER, COLORADO, A CORPORATION OF COLORADO.

SECOND-STAGE TREATMENT FOR BOX-WRAPPING MACHINES.

1,251,814.

Specification of Letters Patent.

Patented Jan. 1, 1918.

Original application filed November 5, 1915, Serial No. 59,860. Divided and this application filed September 25, 1916. Serial No. 122,055.

*To all whom it may concern:*

Be it known that we, MELVILLE E. PETERS, GEORGE H. FATH, and ALBERT F. MILLER, citizens of the United States of America, residing at the city and county of Denver and State of Colorado, have invented a new and useful Second-Stage Treatment for Box-Wrapping Machines, of which the following is a specification.

Our invention relates to a new second stage treatment box edge wrapping machine; and the objects of our invention are:

First, to provide a box edge wrapping mechansm provided with duplicate and independently operating end and side turn in mechanism that is adjustably arranged to receive boxes that have been partially wrapped by previous treatment in other machines. And Second, to provide a box edge wrapping machine comprising successively operating and coöperating end and side box edge blank turn in mechanism that is adjustable to wrap a plurality of boxes of different heights, lengths, and breadths, and that automatically feeds the boxes into wrapping position, and that discharges them from the machine when wrapped.

We attain these objects by the mechanism illustrated in the accompanying drawings, in which:

Figure 1 is a vertical longitudinal sectional view of a portion of a box covering machine, showing the mechanism for effecting the second stage treatment in applying wrappers to boxes.

Fig. 2 is a vertical transverse sectional view on the line 2—2 of Fig. 1.

Fig. 3 is a vertical longitudinal sectional view of one of the side turn-in mechanisms, the same being mounted in its slideway.

Fig. 4 is a front view of Fig. 3.

Fig. 5 is a plan view thereof.

Fig. 6 is a horizontal sectional view on the line 6—6 of Fig. 4.

Fig. 7 is a plan view of the slide block which carries one of the side turn-in blades.

Fig. 8 is a front view of the rock lever which operates the slide block shown in Fig. 7.

Fig. 9 is a side view of the end turn-in mechanisms and a portion of their supporting arm.

Figs. 10 and 11 are end views of opposite ends of one of the end turn-in mechanisms.

Fig. 12 is a central longitudinal vertical sectional view of one of the end turn-in mechanisms.

Fig. 13 is a sectional view—enlarged—on the line 13—13 of Fig. 2.

Fig. 14 is a vertical sectional view through a portion of the vertical movable overhead arm, and one of its hollow standards showing the shafts which extend through said standard, the gear wheels carried thereby, and other mechanism.

Fig. 15 is a transverse vertical sectional view through the table portion of the machine, showing one of the box gripping and transferring mechanisms.

Fig. 16 is a plan view of one of the box gripping and transferring mechanisms.

Fig. 17 is a plan view of a portion of the bed plate of the machine, showing the main driving shaft and mechanism operated thereby for effecting the second stage box wrapping treatment.

Similar letters of reference refer to similar parts throughout the several views.

Our present invention appertains to mechanism that will wrap the projecting ends and sides of blanks that project above the upper edges of boxes, and which have been wrapped against the bottom and the opposite sides and the ends of boxes by a previous treatment, which may be of any suitable character. Our present invention however does not include this previous treatment, and consequently the mechanism by which it may be accomplished is not illustrated. A machine for effecting this prior previous treatment is illustrated in our pending application Serial Number 59,860, filed November 5th, 1915, for a box wrapping machine, and attention is also called to our copending applications Serial Nos. 122,056, 122,059, 122,063 and 122,064, all filed September 25, 1916, which show and claim some of the features of the mechanism of our pending application.

Our present application is a divisional part of that application and our object is to so individualize this second stage blank turning-in mechanism as to enable it to be adaptable for use on other box wrapping machines instead of the mechanism illustrated in our above mentioned pending application.

To this end the numeral 1 designates a supporting frame of any suitable character. We preferably employ however, a box-shaped frame. The shape of the frame however is immaterial, it only being necessary that it be arranged to provide transverse slideways 2 for the turn-in side wiper mechanism, which must be arranged to be moved in unison together to and from the longitudinal center of the machine and of the boxes and their labels as they are fed to the machine.

Our new side and end turn in mechanism comprises duplicate box end turn-in and wiper mechanisms that work jointly in unison and at the same time on opposite ends of boxes synchronously, and it also consists of duplicate side turn-in and wiper mechanisms that work jointly in unison on opposite sides of the box synchronously.

These ends and side turn-in and wiper mechanisms operate in alternate order, as will be presently described. The boxes are wrapped in a separate machine or mechanism which we do not illustrate, with a blank on their bottoms, sides and ends, and they are fed to the mechanism of our machine by hand or preferably by an automatically operating mechanism that is timed to move them in successive order in operative relation to the mechanism of our machine, and then to discharge each box from the machine when wrapped. When each box is fed into the machine it strikes a stop arm, and the stop arm is lowered out of the path of the box. Then the forward end of the box is engaged by an abutment or push block 3 that is clamped on the lower ends of the head block B. There are two of these head blocks B and C, and they have a vertical reciprocal movement of sufficient stroke to rise above and to drop down behind the box, the head block B first pushing it forward against an abutment block 4 formed on the lower end of the opposite head block C, where it is gripped tightly between the members 3 and 4 of the blocks. The box is then first pressed down and is firmly seated against the top of table portion of the frame by a downward vertical movement of the plates 5 of the end turn in mechanism, which will be presently described.

The turning in of the ends of the blank into the ends of the boxes is accomplished by two different and independent operations of the end turn in mechanism and the side turn in mechanisms operate in between the two actions of the end mechanism, and we will first describe the first action of the end turn in mechanism. We will state however that at the time the box is being pushed forward against the abutment block 4 the first step treatment of turning in the ends of the blanks is performed automatically as follows:

The box end blank turning in mechanism comprises two vertically positioned head blocks B and C which are arranged to face each other.

The end turn in mechanism C is fixed relative to the frame of the machine, while the end turn in mechanism B has a short reciprocal horizontal movement by which it engages and moves the box against the abutment block 4 of the turn in mechanism C. After the box has been moved by the movable head block against the fixed head block, it is gripped and held rigidly until the edges of the projecting vertical edges of the blank are completely wrapped in the box. The two head blocks B and C are supported by and depend from an overhead arm 6 which is positioned above the table over its center and extends longitudinally along its entire length from adjacent to its first stage mechanism. This arm has a short vertical reciprocal movement that is imparted to it by a cross head 7 that is raised and lowered by a cam 8. This cross head comprises two cylindrical hub members 9 which are connected by a bar 10 having a central opening 11. Within the hubs are secured the lower ends of two tubular vertical hollow standards 12, the upper ends of which are secured in hub portions 13 of the overhead arm by pins 14 which pass through the said hubs and through the standards. The opening in the bar of the cross head receives a worm gear 15 through which the threaded upper end of a circular bar 16 passes, the lower end of which is secured to a cam fork 17 having a roller 18 which enters a groove in the cam disk 8, and in this manner the cross head and the overhead arm are raised and lowered for a purpose to be hereinafter explained. Upon the hub portions of the cross head 7 are bearings 19 in which is mounted a horizontal shaft 20 having a worm pinion 21 which meshes with the worm gear 15 carried by the cross head. The outer end of this shaft 20 carries a hand wheel 22, by turning which the worm pinion is caused to turn the worm gear 15 in the cross head 7 whereby the threaded rod 16 may be lengthened or shortened to suit the depth of various sized boxes.

The overhead arm is provided with a fixed slideway bar 23 that is secured to its bottom in position to receive the head block C, and with a slideway bar 24 that has a short reciprocal movement, it being slidably mounted on bolts 25 which extend through the arm. The head block C is adjustably mounted on the slide bar 23 and it is secured thereon by a set screw 26 in a position to receive each different size box that the machine will wrap.

The head block B is also adjustably mounted on the movable slideway 24 and is secured thereon in adjusted positions by a set screw 27. Both head blocks are provided with guideways 28 that straddle their slideway bars, and are secured over the side edges of the slideways by cap strips 29 that are secured to their opposite sides. As illustrated in Fig. 1 these head blocks are positioned on their respective slideways in positions to receive between them the largest size box the machine will wrap. The reciprocating slideway bar 24 is provided with a number of gear teeth which are engaged by a pinion 30 that is mounted on a stud screw 31 that is threaded into the side of the overhead arm 6. This pinion 30 also meshes with the teeth 32 of one end of a rack bar 33 that is mounted in a slideway 34 that is formed in the overhead arm 6. The opposite end of this rack bar is also provided with gear teeth that mesh with a gear 35 that is mounted on the end of a short shaft 36 that is suitably journaled in a vertical bearing 37 on the overhead arm. The upper end of the shaft 36 is also provided with a gear 38 that meshes with the teeth of one end of a rack bar 39 that is slidably mounted in a suitable bearing 40 secured upon the overhead arm. The opposite end of this rack bar is also provided with teeth that mesh with a gear 41 which is preferably brazed upon the top end of a square tubular shaft 42 that surrounds loosely a solid square shaft 43. The upper end of this square solid shaft is rounded and passes loosely through the gear 41, the solid shaft having a shoulder at the junction of its round and square portions, which bears against the gear 41. This square tubular shaft extends down through the frame and passes loosely through a gear 44 that is rotatably mounted in a suitable bearing on the frame in which the gear is supported against vertical movement. A rack bar 45 is reciprocally mounted in the frame and its gear teeth mesh with the gear 44. The opposite end of this rack bar is pivotally connected to one end of a link 46, the opposite end of which is connected to one arm 47 of a double armed lever, which is pivotally mounted in a journal block 48, that is secured to the bed plate of the frame. The upper end of the other arm 49 of this double armed lever is provided with a roller which engages a groove in one side of a cam 40 that is mounted on a cross shaft 51. This cross shaft has secured upon it the bevel gear 52, which meshes with and is driven by the bevel gear 53 that is mounted on the end of the main driving shaft 54. The lower end of the solid shaft 43 passes loosely through a gear 55 which is mounted in a bearing 56 secured to the adjacent side of the frame. The gear 55 is in mesh with a rack bar 57, the opposite end of which is connected to a link 58, the other end of which connects with one end of a lever 59 which is loosely mounted on the stationary shaft 60. The intermediate portion of this lever carries a roller, which enters a groove in the opposite side of the cam 50.

The upper end of the solid square shaft 43 carries a gear wheel 61, the function of which will be hereinafter set forth. The rack bar 57 has a bend, as shown, so as to pass the circumferential edge of a cam 62. A cam 50 is secured upon the opposite end of the shaft 60, which operates a duplicate arrangement of the levers and rack bars just described, which rack bars operate a duplicate arrangement of the gears 44 and 55 and shafts 42 and 43. The upper end of the right hand hollow shaft 42 carries a gear wheel 63, and the upper end of the right hand solid shaft 43 carries a gear wheel 64, the function of which will be hereinafter described.

Each head block is provided on its right hand side with a worm pinion 65 which is rotatably mounted in bearings formed on the side of each block. Each worm pinion of each head block meshes with a toothed segment 66, that is secured on one end of a pin 67, which is pivotally secured in the head block. A depending lever 68 is rigidly secured upon the pin, the lower end of which is arranged to engage a pin 69, which extends loosely through a long slot 70 formed in each block, and also through a slot 71 that is formed through a plate 72 that is reciprocally mounted in a slideway 73 that is formed in the outside edge of the head block, said pin 69 being threaded in a finger blade or bar 5 which is seated in a slot formed in the outside surface of the plate 72. This finger blade is pivotally secured at its upper end by a pin 74 to the plate 72. The pin 69 is provided with a screw driver head to permit it to be adjusted to receive the stroke of the lever 68 due to the reverse rotary movement of the worm by its toothed segment, as will be hereinafter explained.

The worms are each provided with a square axial aperture in which a square shaft 75 fits loosely, and the head block and their worms are arranged in alinement on the overhead arm and the square shaft 75 extends across and through and beyond both worms. Consequently the worms of both head blocks are rotated in unison, and the levers 68 engage both pins 69 at the same time and swing the lower ends of the finger blades out from the plates at the same time. The finger blades are returned into their slots on the backward stroke of the levers 68 by expansive springs 76 which are mounted on pins 77 that extend loosely through apertures formed through the finger blades and are threaded into the plates 72.

The shaft 75 and the worms are rotated by a train of gearing in the following manner:

The pinion 61 on the upper end of the left hand solid shaft 42 meshes with one end of a rack bar 78, the opposite end of which meshes with a pinion 79 that is secured on the end of a shaft 80, the opposite end of which is provided with a bevel gear 81 that meshes with the bevel gear 82 on the end of the shaft 75. Thus the cam 50 through the lever arms 59 and link 58 and left hand rack bar 57 imparts movement to the left hand solid shaft through its pinion 55, and the gear 61 on the upper end of this shaft operates the rack bar 78 which operates the gear 79, the lower end of whose shaft carries the gear 81 which operates the bevel gear 82 on the shaft 75, whereby the worms 65 are turned in unison, and the arms 68 thereby moved against the pins 69 to swing the plates 5 outward.

The plate 72 of each head block has a vertical reciprocal movement imparted to it of about a half inch stroke, which movement is effected in the following manner: A link 83 is pivotally secured at one end to each plate 72 by a pin 84 that extends loosely through an aperture in the finger blade 5 and is threaded into the plate, and the opposite end of this link is pivotally connected at one end to a link 85, the opposite end of which fits loosely on a square shaft 86, that is mounted in sleeve bearings 87 rotatably journaled in bearings 88 that are formed on the head block (see Fig. 13). The square shaft 86 is rounded at its rear end and extends through a bearing 89 on the transverse portion of the overhead arm 6, and a bevel gear 90 is secured to this end and the shaft is partially rotated or oscillated by a train of gearing in the following manner: The pinion 64 on the upper end of the right hand solid shaft 43 meshes with one end of a rack bar 91, the opposite end of which meshes with a pinion 92 that is secured on the end of a shaft 93, the opposite end of which is provided with a bevel gear 94 that meshes with the bevel gear 90 on the adjacent end of the shaft 86. Thus the movement of the right hand cam 50 is imparted to the shaft 43 in the same manner described in connection with the left hand cam 50, and the shaft 43, the mechanisms operating these two shafts being duplicates of each other, and located on opposite sides of the machine.

After the head blocks B and C have dropped down at a short distance behind the box, the head block B is moved forward by the pinion 30 and rack bar 24 and as its push block 3 advances to the box, the upwardly beveled bottom surface of its finger block 95 engages the up-standing edge of the blank and bends it inwardly over the top edge of the box to the same angle as the bottom of the finger. Then the box is engaged by the push block 3 and is moved forward against the abutment block 4 of the head block C and as the box moves toward that abutment block the rear end of the box and the up-standing edge of the blank are pushed against the beveled bottom surface of the finger block 96 of the head block C, and as the rear end of the box advances under this finger the up-standing edge of the blank is bent into the box down to the edge of the box, which is engaged by the base edges of both finger blocks when the box is finally gripped between the push and the abutting blocks of both heads. The finger blocks are then both raised upward vertically about a half of an inch by the movement of their links 83 and 85 and the square rod 86 and by the same means are then moved straight down until the heels of these finger blocks rest directly on top of the end edges of the box, when pressure enough is applied to them through the links to firmly seat the box against the top of the table, and both finger blocks are then raised and remain up while the side turn-in mechanisms advance and turn over and in and against the inside surfaces of the box the upwardly projecting side edges of the blank.

These mechanisms that turn in the opposite side edges of the blank into the box are constructed, arranged and operate as follows:

To the top of the table on opposite sides of its longitudinal center and at equal distances from it, we secure two head blocks 97, which support the side turn-in mechanisms. The side turn-in mechanisms of these two head blocks face each other and as they are exactly alike a description of one will suffice for both.

Each head block consists of a base portion 97 that is slidably mounted to be moved in a horizontal plane in the transverse slideway 2 formed in the table, and a vertically movable chuck block 98 that is vertically adjustable upon upwardly projecting standards 99 that are formed on the base 97. The standards are yoke shaped and are provided with guideways and each chuck block is provided with a capped lug portion 100 that is slidably mounted in the guideway of the standard. A threaded rod 101 is rotatably mounted at its upper end in a bushing 102 at the top of the standard and threads down through the lug 100 of the chuck block, its lower end resting in a bearing 103 in the adjacent end of the base 97. The threaded rod is adapted to receive a wrench to turn it to raise or lower the chuck block which has a vertical movement on the standard sufficient to allow it to be adjusted to all heights or depths of boxes the machine will wrap. This chuck block extends down through a slot in the table, when adjusted for boxes of slight depth, and it is adjustably movable up and down to accommodate boxes of different depths, and is fixed in adjusted positions by its cap 104 which can be clamped tightly to the standards. The chucks face the opposite sides of the box that is to be wrapped (see Figs. 2 and 3), and the opposing side members of each chuck are each provided with a semi-circular slideway 105, and in each pair of slideways is mounted a segmental block 106, which therefore travels in a semi-circular path and is moved in this path by a combination of link and lever members, which are constructed and act as follows:

The segment block is of the form shown in Figs. 3 and 4, and is provided with a depending lug 107, to which one end of a link 108 is pivoted. The lower end of this link is provided with an oblong slot and is pivotally connected through this slot by a pin 109 to the upper end of a vertically reciprocable bar 110, which is slidably mounted in a guide 111 that is formed on a depending portion of the head block.

The lower rounded portion of each of the bars 110 is provided with an adjustable collar 112 that rests on a spring 113 that is housed in a socket 114 that is attached to the cross bar 115, which cross bar is given a vertical reciprocating movement by a forked lever 116, to which it is bolted, and which is operated by a cam 117, which is secured upon the main driving shaft 54. The upper end of the forked lever 116 moves in a guideway of a standard 118, which is bolted to the bed plate. The upper portions of the bars are square, but the lower portions thereof are rounded and extend through the springs 113 and sockets 114 to allow for vertical adjustments to correspond with adjustments of the head blocks to fit boxes of different heights.

Each bar 110 has a rib portion 119 that has a cam curve 120 at its upper end, that engages a roller 121 that is mounted on the depending member 122 of a rock arm. This rock arm comprises a long hub 123 that is pivotally mounted on a pin 124 that extends through it and the sides of the chuck, the depending member 122 and two arms 125 spaced a short distance apart and extending upward, the end of each of which terminates in a fork 126 in which lie rollers 127 which are mounted on opposite sides of a hub portion on one end of a sliding block 128, which is reciprocally mounted in a slideway 129 formed in the top of the segment block 106. Arms 130 project from the opposite ends of the hub, the outer ends of which are connected to the lower ends of springs 131 that act to normally hold the rollers 121 in contact with the ribs 119 of the bars 110. The opposite ends of the springs are connected to pins 132 that are secured to the sides of the chuck. This sliding block is provided with a cap 133 that is arranged to clamp a side turn-in blade 134, as shown by Figs. 3, 4, and 5. The side turn-in blades are of a length corresponding to the inside length of the boxes being covered.

Along the front face of each chuck we secure a bar 135, against which the upper edges of the sides of the boxes bear, when the turn-in blades bend the extended portions of the sides of the blank over against the inner faces of the sides of the box, as shown by the dotted lines in Fig. 3.

These two chuck heads and their bases are arranged to be moved in unison together toward or away from the longitudinal center of the machine in the following manner:

Each head block is formed with an opening in which is secured an internally threaded bushing 136, in which is screwed a plug 137, having a square hole, the outer end of the plug having an annular groove 138. Through these plugs passes a square rod 139, the ends of which are rounded and enter bushings in the sides of the table. A threaded rod 140 extends parallel with and adjacent to the square rod 139, and upon the end portions of the threaded rod are screwed followers 141, comprising hub members having arms, the outer ends of which are bifurcated, and straddle the annularly grooved ends of the plugs 137. Thus by turning the crank handle 142 on the end of the threaded rod 140, the said rod is rotated, and the head blocks are moved inward or outward, in their slideways 2.

The object of threading the plugs 137 to the bushings 136 is as follows: When the boxes pass into position, the head blocks stand in such positions relatively to each other that the boxes may pass readily between the bars 135 without touching them, but after they have reached their proper position, it is necessary that their sides should be engaged by the said bars 135, and to accomplish this a slight inward movement is given to each head block, by turning the square rod by which the plugs 137 are turned, and as the plugs when turned by the square rod are held against lateral movement by the followers 141, the head blocks are thereby moved in or out according to the direction of rotation of the plugs. The square rod is turned in the following manner: A cam disk 143 on the main shaft 54 has a cam 144 which engages a roller on one member 145 of a double crank arm, which is supported in a bracket 146 that is bolted to the bed plate of the machine. The other arm 147 connects with the lower end of a connecting rod 148, the upper end of which is pivotally attached to a lever 149, which is mounted on the adjacent end of the square shaft. It will thus be seen that the cam 143 imparts movement to the connecting rod 148, by which the lever 149 is rocked and the shaft turned.

The chucks having been adjusted with their guide strips in operative relation to receive a box and blank between them, the segment block and the sliding block operate to cause the side turn-in blade 134 to turn in the upwardly projecting side edges of the blank into the interior and against the inside surfaces of the box in the following manner: When the bars 110 are raised by the cam 117 the cam curve 120 at the upper end of the bars first engages the rollers 121 of the rock arm, which causes the lower ends of the rock arms to swing out and their upper end to push the sliding blocks 128 forward toward the box, which causes the side turn-in blades to move horizontally forward and engage the projecting edges of the blank, and in moving forward they barely clear the top side edges of the box; then as they reach the end of their inward stroke the pins 109 at the tops of the bars 110 have by this time moved up with the bars to the upper end of the slots in the links 108, which connect the bars with the segment blocks 106 and thus lift the segment blocks, causing them to move in an arc of a quarter of a circle in the semi-circular curved slideways of the chucks, which causes the sliding blocks and the turn-in blades to tilt upward into vertical positions, and as the blades tilt over the side edges of the box they bend the edges of the blank over into the box and against its inside surfaces and the blades press the blank tightly against the inside surfaces of the box when it swings into a full and a trifle more than a full vertical position, which brings a decided side pressure of the blades 134 against the inside of the box, thus firmly pressing the edge of the blank against the inside surface of the box, the turning in blades thus rolling over the edge of the box and pressing flat against its inside surface, the sides of the box with the turned in blank being pressed between the said blades and the bars.

When the segment blocks move upward in their curved slideways 105 in the chucks, they lift the rollers 127 of the sliding block 128 out of the yoke ends 126 of the arm and swing them up into such a vertical position as is necessary to cause the finger blade to press the edge of the blank against the inside surface of the box.

When the side turn in blades 134 have been firmly pressed against the inside of the box, their cam and rod and link operating mechanism hold them there long enough to allow the blank edge turning in end fingers to complete their blank turning in action. This they now do by the rotary action of the worms 65, which now act through their cam and lever and gearing actuating mechanism to move the toothed segments 66, which consequently rock the levers 68 to engage the pins 69, by which the plates 5 with their end turned-in blocks 95 are swung outward or toward each other, and instantly thereafter, the rod 86 is partially rotated, in the manner previously described, and the members 72 with the plates 5 are depressed through the medium of the links 83, and levers 85, and the blocks 95 pass down into the box, the ends of which pass between the turn-in blocks 95, and the abutment blocks 3 and 4 respectively, whereby the ends of the blank are folded down against the inside surfaces of the ends of the box.

Consequently the end turned-in blocks on this their second downward movement complete the end turning-in operation of the edges of the blank.

These end turn-in blocks are so formed that they fit down into the box between the side turn-in blades and press the corners of the blanks down smoothly into the corners of the box. The end blocks then first move up out of the box and then the side blades are swung to a horizontal position by the downward movement of the bars 110, and the links 108, and the rollers 127 of the sliding block 128 are swung down into the forks of the rock arm, and when the curved cams 120 of the bars pass below the said rollers the contraction springs 131 swing the rock arms backward, which movement draws the sliding block and the side turn-in blades back out of the path of the box, which is now wrapped as far as the action of the second stage mechanism of the wrapping machine will wrap it, and it is now ready to be transferred from this station to the third stage treatment station. A stop pin 150 extends through the rear end of the plate and into a recess 151 in the rear end of the segmental block 106, and prevents dropping of the plate in its slideway in the block, when the block has been moved to the position shown in dotted lines, Fig. 3, in which the plate 128 stands vertical. The blades 134 however are not withdrawn from contact with the edges of the sides of the box, until after the box has been engaged by the grippers 152.

The ends and sides of the top edges of the blank have now been completely wrapped and glued against the interior surfaces of the box, and are completed, and the head blocks have been raised up above the box by the upward vertical movement of the overhead arm 6. Then the box gripping and transferring clips 152 and their operating mechanism act to move the box out of the mechanism and to discharge it from the machine.

The boxes are fed by suitable mechanism from the first stage section to and against a suitable stop 167, where it is in position to be acted upon by the side and end-turn-in mechanisms.

The side and end turn in mechanisms are also set to receive the largest size boxes the machine will wrap. In order to move the carriage 189 and its stop arm to stop smaller sized boxes down to the smallest size the machine will wrap, we provide a hand operating threaded rod 190 which is rotatably threaded to the carriage, while its outer end is rotatively mounted in a bearing 191 formed on the cross rib of the adjacent end of the table. A hand grasping knob 192 is mounted on the outer end of the rod, which is so arranged in its bearing that when it is turned by hand the bracket and arm are moved along the rails 193 of the slideway 194, to the required point relatively to the length of boxes being covered.

The longitudinal center of the end and side turn in mechanism of the machine is defined by a vertical arrow (Fig. 1) and all adjustments of the box wrapping and transferring mechanisms for different sizes of boxes are made relative to this point as the center of the length of the box being wrapped by the turn-in mechanism.

A slot 195 of suitable length is formed in the bottom of the slideway 194. A spur gear 196 is loosely mounted on a cross shaft 197 that extends across and is secured in bearings in the sides of the table. The spur gear projects up into the slot 195 and meshes with a toothed rack bar 198 which we term the box shifter rack, and which is mounted in the slideway 194. The gear wheel 196 has a pinion gear 199 rigidly secured thereto in any suitable manner, and this pinion meshes with a toothed bar 200, the lower end of which is bolted to a forked lever 201, which straddles the main shaft 54, and is provided with a roller which enters a suitable cam groove in the cam disk 62, which is mounted on the main shaft. The upper end of the toothed bar 200 passes through a guideway 202, which is rigidly secured to the shaft 197. This box shifting rack bar is provided with a centrally projecting flange 203, which extends throughout its full length. This box shifting rack is held in the slideway by caps 204, which are screwed to the top edges of the slideway. To the flange above these caps two clips 205 are secured, that project above the flange and form bearings for the opposite ends of a right and left hand threaded rod 206. Upon the opposite ends of the threaded rod 206, blocks 207 are threaded, the upper ends of which are bifurcated to receive the lower ends of the gripping arms 152, which are rigidly mounted upon pins 208, which are pivotally mounted in the bifurcated ends of the said blocks, their ends extending beyond the sides of the blocks.

Upon one end of each of the pins is rigidly mounted an arm 209, the arms extending in opposite directions, and upon the outer end of each arm is mounted a roller 210. Upon the opposite end of each pin is secured a nut or washer 211, and a coil spring 212 is mounted on the pin between the nut and the block 207, one end of which enters a hole in the nut and its other end enters a hole in the block, these springs being under tension which is exerted to raise the arm so that their outer ends, which are upturned, will extend a slight distance above the plane of the table. The lower ends of the blocks 207 are also bifurcated, and are slidably mounted on the flange 203 of the rack bar 198.

These box gripping arms 152 have their upper ends arranged to stand vertically upright when at the limit of their upward movement, and these upper ends are adapted to move against and grip the opposite ends of each box with sufficient pressure to hold it and move it to discharge it from the machine.

The outer end of the threaded rod 206 is provided with a transversely positioned pin which with the terminal end of the rod is adapted to receive a hand operated socket wrench by means of which the threaded rod may be turned and the blocks 207 moved toward or away from each other to grip any size box from the smallest to the largest; as illustrated they are shown arranged to grip the largest size box the machine will wrap. These box grippers are moved down out of the way of each box as they discharge it from the machine by a longitudinal bar 213, the upper edge of which terminates in a horizontal lip 214, which at all times engages the rollers on the arms 209. The opposite ends of the bar 213 are pivotally attached to levers 215 and 216 respectively, the opposite end of the lever 216 being loosely mounted on the threaded rod 140, which extends transversely across the table and is mounted in bearings in opposite sides of the frame. The lever 215 is mounted midway of its length upon a stationary shaft 217, which extends transversely across the table and is supported in the sides thereof.

The opposite end of this lever 216 is pivotally attached to one end of a connecting rod 218, the opposite end of which is pivotally connected to a lever 219, which is mounted midway of its length upon the stationary shaft 60, also supported in the side frames of the machine. The opposite end of the lever 219 carries a roller 220 which is engaged by a cam 221 on the circumferential edge of a disk 222, which is rigidly mounted on the shaft 51, which is supported in bearings in the side frames of the machine. The roller is held against the edge of the cam disk 222 by a coil spring 224, which surrounds the shaft 60, and is attached at one end to the lever 219, and at the other end to a collar on the said shaft. The shaft 51 carries the bevel gear wheel 52 which meshes with a similar gear 53 on the adjacent end of the main shaft 54.

As the disk 222 rotates, the cam 221 engages the roller 220, thereby rocking the lever 219, by which the rod 218 is drawn upon and the lever 215 rocked, its upper end being raised together with the upper end of the lever 216, which moves in unison with the lever 215, through its connection with the bar 213. This movement of the levers 215 and 216 raises the said bar 213, the lip 214 of which engages the rollers 210 on the arms 209, which, with the grippers are permitted to rise to the position shown in Fig. 1, the cam 221 being timed to effect the raising of the bar 213, to allow the grippers 152 to engage each box as it comes from the first stage wrapping station.

These box grippers are positioned in the longitudinal slot 227 of the top of the table above the stop lever 167, and the stop lever cannot move up to stop a box coming to the turn-in mechanism except when the box shifting grippers are in their box discharging position.

When a box is fed either by hand or by an automatic feeding mechanism to the pneumatic cylinder and plunger, it is moved forward one inch into position to have its upper ends turned in and wrapped against the inside of the box.

The box is now in operative engaging relation to the end and side turn-in mechanisms, the operation of which has been above described.

Our invention provides a reliable, positively, operating box ends and sides turn in mechanism that operates on the boxes with great rapidity, and a mechanism that will completely wrap from about thirty-five to fifty partially wrapped boxes per minute, and will automatically feed the boxes into proper position to be engaged by these turn-in mechanisms, and will discharge them when completely wrapped from the machine; and while we have described and illustrated the preferred construction and arrangement of our end and side turn in mechanism we do not wish to be limited to the construction and arrangement illustrated and described, as many changes might be made without departing from the spirit of our invention.

Having described our invention, what we claim as new and desire to secure by Letters Patent, is:

1. In a box edge wrapping machine, the combination with a support having a vertical movement and end-turn-in mechanisms on said support, of side-turn-in mechanisms which act in coöperation with the end-turn-in mechanisms, and means for operating said mechanisms.

2. In a box edge wrapping machine, the combination with a table and side-turn-in mechanisms mounted thereon, of a support having a vertical movement with respect to the table, and coöperating end-turn-in mechanisms mounted thereon.

3. In a box edge wrapping machine, the combination with a table and oppositely positioned side-turn-in mechanisms mounted thereon, of a horizontal support vertically movable with respect to said table and oppositely positioned end-turn-in mechanisms on said support.

4. In a box edge wrapping machine, the combination with a table and oppositely positioned side-turn-in mechanisms adjustably mounted thereon, of a horizontal support vertically movable with respect to said table, and oppositely positioned end-turn-in mechanisms adjustably mounted on said support in position to coöperate with the side-turn-in mechanisms.

In testimony whereof we affix our signatures in presence of two witnesses.

MELVILLE E. PETERS.
GEORGE H. FATH.
ALBERT F. MILLER.

Witnesses:
G. SARGENT ELLIOTT,
ADELLA M. FOWLE.

Copies of this patent may be obtained for five cents each, by addressing the "Commissioner of Patents, Washington, D. C."